United States Patent [19]

Jacobs

[11] 3,941,549

[45] Mar. 2, 1976

[54] RECIPROCATING SCREW INJECTION MOLDING MACHINE WITH HYDRAULIC ACTUATING MECHANISM WITH PREFILL VALVE

[76] Inventor: Arthur W. Jacobs, 5994 Columbia Road, North Olmsted, Ohio 44070

[22] Filed: June 26, 1974

[21] Appl. No.: 483,124

[52] U.S. Cl.............. 425/451.2; 91/411 R; 92/152; 425/DIG. 223
[51] Int. Cl.$^2$........................................ B29F 1/06
[58] Field of Search 425/167, 451.2, 150, DIG. 223, 425/154; 91/411, 189; 92/182

[56] References Cited

UNITED STATES PATENTS

| | | | |
|---|---|---|---|
| 3,084,512 | 4/1963 | Huelskamp | 425/DIG. 223 X |
| 3,401,713 | 9/1968 | Ohlmsted | 91/189 X |
| 3,603,210 | 9/1971 | Florjancic | 425/DIG. 223 X |
| 3,677,685 | 7/1972 | Aoki | 425/451.2 |
| 3,781,160 | 12/1973 | Mankowsky | 425/DIG. 223 X |

*Primary Examiner*—Ronald J. Shore
*Assistant Examiner*—David S. Safran
*Attorney, Agent, or Firm*—Donnelly, Maky, Renner & Otto

[57] ABSTRACT

A reciprocating screw injection molding machine characterized in that the screw is actuated by coaxial hydraulic rotary and linear motors, and in that a movable mold supporting platen has a clamping piston thereon which is reciprocable in a clamping cylinder, the latter having mounted thereon platen and valve actuating cylinders which are operatively secured to the clamping piston and to a valve member respectively to effect movement of the clamping piston and movable mold supporting platen toward and away from a fixed mold supporting platen and to open the valve member for flow of oil from a prefill tank into the clamping cylinder chamber and vice versa, said valve actuating cylinder further being operative upon closing of the mold to close the valve and to admit fluid under pressure into the clamping cylinder chamber to pressurize the trapped fluid therein to lock the clamping piston and movable mold supporting platen in mold closing position with required tonnage for injection of plasticized material into the mold cavity by operation of the injection assembly.

7 Claims, 3 Drawing Figures

U.S. Patent    March 2, 1976    Sheet 1 of 2    3,941,549
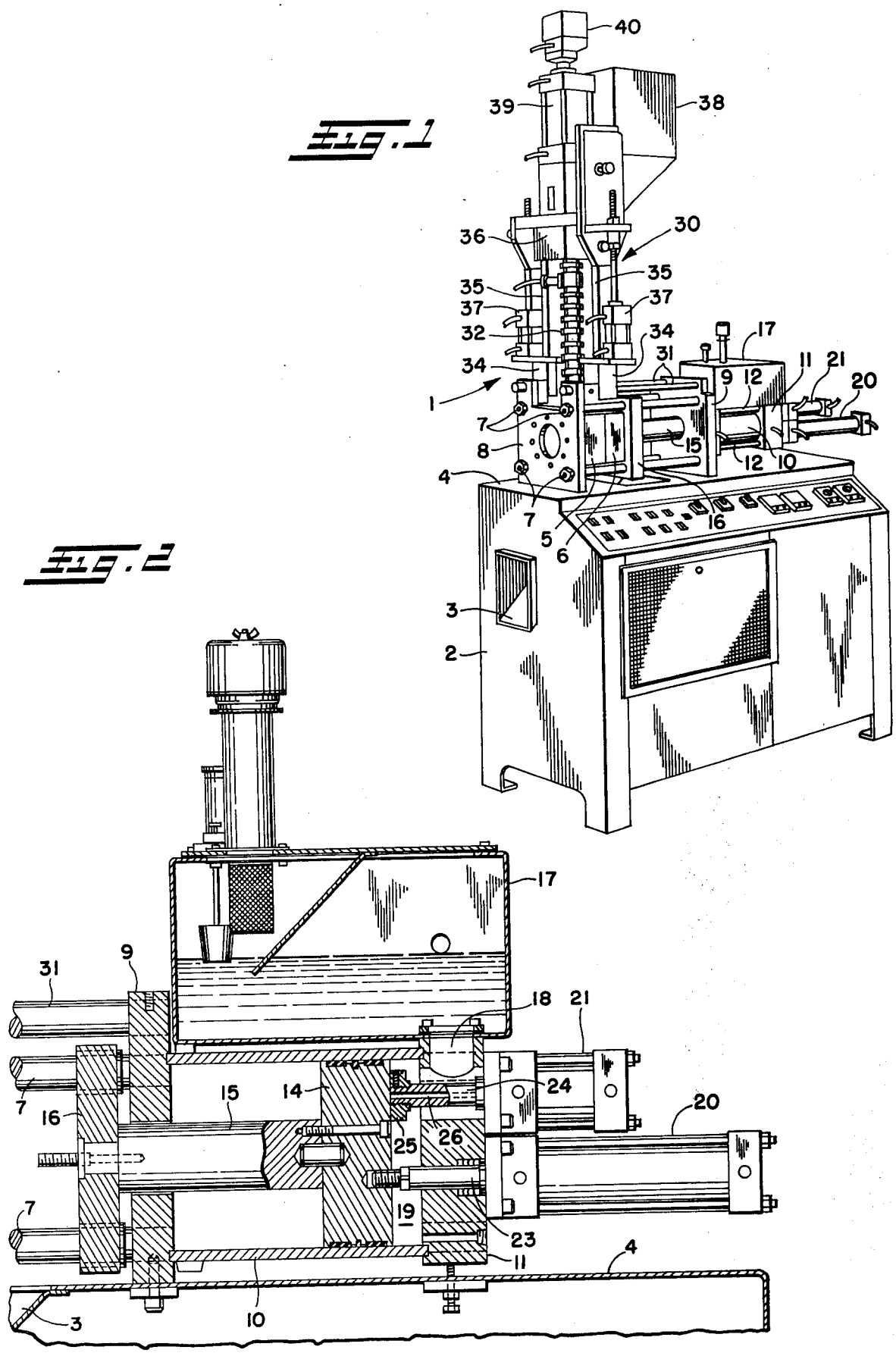

3,941,549

RECIPROCATING SCREW INJECTION MOLDING MACHINE WITH HYDRAULIC ACTUATING MECHANISM WITH PREFILL VALVE

BACKGROUND OF THE INVENTION

Known injection molding machines having a reciprocating screw injection system and a straight hydraulic mold clamping system are of complex, expensive construction. For example, known straight hydraulic clamping systems generally comprise a mold clamping cylinder having its piston secured to the movable mold supporting platen, said cylinder having a pullback area to which fluid under pressure is supplied to move the piston in mold opening direction and having a central blind bore slidably fitted on a fixed tubular booster or jack ram, said last-mentioned ram having a spring and pressure actuated prefill valve slidable thereon which opens communication between a prefill tank and the chamber of the clamping cylinder during the opening and closing strokes of the mold clamping piston and which is actuated by fluid under pressure brought in through the tubular booster ram to close communication between said chamber and said prefill tank and to open communication between the fluid pressure source and said chamber to pressurize the trapped fluid therein so as to exert required mold locking force for injection of plasticized material into the closed mold cavity.

SUMMARY OF THE INVENTION

In contradistinction to knonw injection molding machines having reciproacating screw injection and straight hydraulic clamping systems the reciprocating injection molding machine employs commercially available hydraulic components such as linear and rotary fluid motors for reciprocating and rotating the screw and for actuating the injection assembly to move the injection nozzle into and out of engagement with the mold and employs generally conventional double acting cylinders for actuating the mold clamping piston and for actuating a prefill valve to open and close a passage between the mold clamping cylinder chamber and a prefill tank, said valve actuating cylinder in check valve closing position being operative to communicate the high pressure fluid pressure source with the clamping cylinder chamber to pressurize said chamber to lock the mold clamping piston in mold closing position to resist mold upon injection of plasticized material into the mold cavity. valve It is a principal object of this invention to provide an injection molding machine having a simple and reliable hydraulic mold clamping system in which the head of the clamping cylinder has secured thereto a pair of double acting hydraulic cylinders, one of which has its piston rod mechanically connected to the clamping piston for moving the latter in mold closing and mold opening direction, and the other of which has its piston rod fashioned as a valve member to open a passage in said head to the clamping cylinder chamber and to a prefill tank for flow of oil from the prefill tank into the clamping cylinder chamber during the mold closing stroke of the clamping piston, and for flow of oil from the clamping cylinder chamber into the prefill tank during the mold opening stroke of the clamping piston, said valve actuating cylinder when actuated in the opposite direction moving the valve member to passage closing position while at the same time opening communication between the fluid pressure source and the clamping cylinder chamber when the clamping piston is in mold closing position, such fluid under pressure being effective to pressurize the trapped fluid in the clamping cylinder thus to exert the required locking tonnage to hold the mold in closed condition during injection of plasticized material into the cavity thereof.

It is another object of this invention to provide an injection molding machine of the character indicated embodying a novel hydraulic system including a dual pump and control valve means for the fluid motors of the injection system and the cylinders for the mold clamping system to achieve automatic operation of the machine through its mold closing cycle, the injection cycle, and the mold opening and molded part ejection cycle.

Other objects and advantages will appear hereinafter.

BRIEF DESCRIPTION OF THE DRAWING

FIG. 1 is a perspective view of an injection molding machine embodying the present invention;

FIG. 2 is a cross section view of the hydraulic mold actuating mechanism; and

DETAILED DESCRIPTION OF A PREFERRED EMBODIMENT

Figure 3:
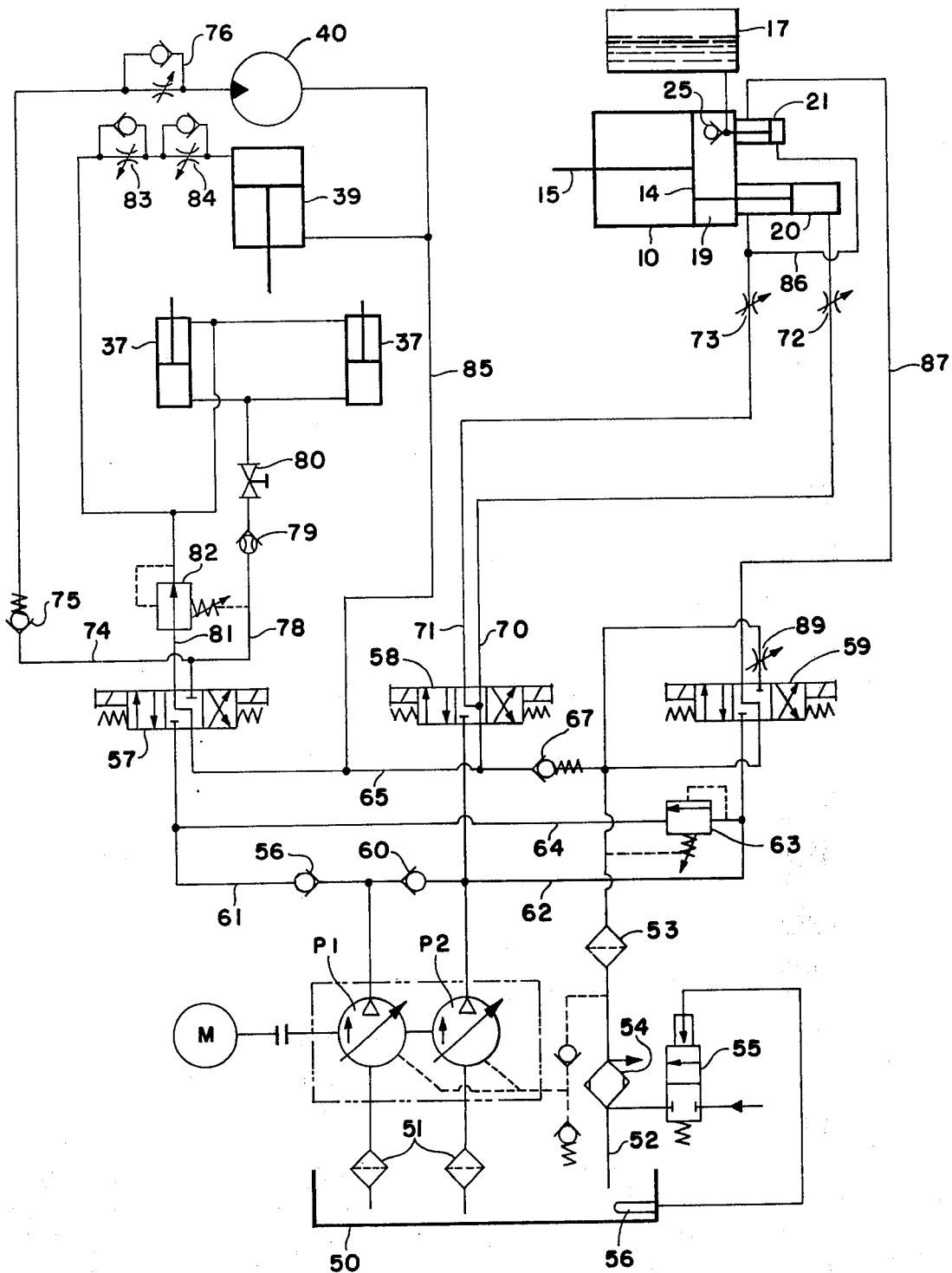
FIG. 3 is a schematic piping diagram by which the operation of the machine is rendered automatic with the various fluid motors and cylinders actuated in desired sequence for repetitive molding of plastic parts.

The injection molding machine 1 herein is generally of the type disclosed in U.S. Pat. No. 3,810,728 and in the pending U.S. application Ser. No. 354,655, filed Apr. 26, 1973, now U.S. Pat. No. 3,871,805.

As best shown in FIG. 1, the injection molding machine 1 herein comprises a base structure 2 housing the hydraulic system pump and drive motor and controls for operation of the machine and including at one end a discharge chute 3 for molded parts which opens in the top 4 of the base 2 beneath the mold sections 5 and 6 when the mold is open. Secured to the top 4 of the base 2 and to each other by parallel tie rods 7 are parallel fixed heads 8 and 9 of which the head 8 constitutes the fixed mold 5 supporting platen and of which the other head 9 constitutes the head of a clamping cylinder 10 which has its other head 11 secured as by tie rods or bolts 12 to said fixed head 9. Reciprocable in the clamping cylinder 10 is a mold clamping piston 14 which has its piston rod 15 secured to the movable mold 6 supporting platen 16 which is guided on said tie rods 7 for movement toward and away from the fixed platen 8 to close and open the mold 5–6.

The clamping cylinder head 11 has secured thereto a prefill tank 17 and provides a passage 18 to intercommunicate the interior of the prefill tank 17 with the clamping cylinder chamber 19.

Also secured to said clamping cylinder head 11 are a pair of double acting hydraulic cylinders 20 and 21 of which the cylinder 20 has its piston rod 23 connected to the mold clamping piston 14 as shown in FIG. 2 whereby the mold clamping piston 14 may be moved in mold closing and opening directions in response to actuation of the piston 23 in opposite directions.

The other cylinder 21 is a valve actuating cylinder which has on its piston rod 34 a valve member 25 which as shown in FIG. 2 opens communication between the prefill tank 17 and the clamping cylinder chamber 19 during the opening and closing strokes of the clamping piston 14 for flow of oil through passage 18 from the prefill tank 17 into said chamber 19 during the mold closing stroke, and for flow of oil through passage 18 from said clamping cylinder chamber 19 into said prefill tank 17 during the mold opening stroke of the clamping piston 14. When the piston rod 24 is moved to the right as viewed in FIG. 2, the valve member 25 closes the passage 18 between the chamber 19 and the prefill tank 17 and at the same time fluid under pressure is admitted into the chamber 19 via the orifice 26 in the piston rod 24 which opens into the pressure chamber in the rod end of the cylinder 21, thus to pressurize the trapped fluid in the chamber 19 to exert the required mold locking tonnage to resist mold separation when plasticized material is injected into the mold 5-6 cavity. Detailed reference to the control of the operation of the actuating cylinders 20 and 21 will be set forth in connection with the detailed description of the hydraulic circuit as shown in FIG. 3.

The injection assembly 30 herein is generally of the type disclosed in the aforesaid patent, i.e., it is a reciprocating screw injection system. The injection assembly 30 is longitudinally adjustable on a pair of parallel rods 31 extending between the heads 8 and 9 to align the nozzle end of the heating cylinder 32 with the mold 5-6 sprue. The blocks 34 of the injection assembly 30 are longitudinally adjustably secured to said rods 31 and have upstanding shafts 35 on which the injection assembly head 36 is vertically reciprocated by means of double acting hydraulic cylinders 37 effective to move the nozzle end of the heating cylinder 32 into and out of engagement with the mold sprue. Said head 36 of the injection assembly 30 is provided with a feed opening through which plastic material in pellet or chip form passes from the hopper 38 into the injection cylinder 32 around the flight of the screw which is rotatable in and axially reciprocable in said injection cylinder 32.

The nozzle end of the injection cylinder 32 preferably has a pressure actuated shut-off valve therein such as disclosed in the aforesaid U.S. Pat. No. 3,871,805 and, upstream of said nozzle valve, will be a spreader also of the type disclosed in said patent. The upper end of the screw is secured to the piston rod of a piston reciprocable in the hydraulic cylinder 39 and said piston in turn will have an axially slidable splined connection with the drive shaft of a rotary fluid motor 40, the housing of which is affixed to the top head of the cylinder 39.

As shown in the art, the rotation of the feed screw in the heating cylinder 32 will advance plastic material around the screw toward the tip thereof to melt the same and deposit it into a collecting chamber which progressively increases in size as the screw rotates and is forced upwardly by the pressure of the material in the collecting chamber against an adjustable back pressure maintained in the upper end of the cylinder 39. When the collecting chamber has a desired volume of material therein to fill the mold cavity fluid under pressure will be admitted into the upper end of the cylinder 39 to cause the piston and screw to move downwardly to cause the screw to act as an injection plunger and, upon increase of pressure on the melted material in the collecting chamber sufficient to open the pressure actuated nozzle valve, the plasticized material will be injected through the nozzle of cylinder 32 into the mold cavity and, of course, the cylinders 37 will have been actuated to have moved the injection heating cylinder 32 downwardly to interengage the nozzle end with the mold 5-6. As later explained in detail, the mold 5-6 is locked in closed position to permit application of the required high pressure on the plastic material to form a molded part in the mold cavity. After the injection stroke has been completed, the injection assembly 30 may be raised from the mold 5-6 and the rotation of the screw reinitiated to provide the next charge of plasticized material in the collecting chamber, and as the screw is thus rotated, the mold 5-6 may be opened and the molded part ejected from the mold cavity for discharge into the discharge chute 3 in the base 2.

Referring now in detail to FIG. 3, the hydraulic system herein incudes a dual pump P1-P2 driven by motor M, said pumps P1 and P2 having their inlet ports communicated with the oil in a reservoir 50 via strainers 51. The oil return line 52 has therein a filter 53 and a heat exchanger 54 for cooling the oil returned to the reservoir 50, the circulation of coolant such as water being controlled by a valve 55 operated by a thermostat 56 immersed in the oil in said reservoir 50.

The pumps P1 and P2 are of variable displacement type as shown, the pump P1 supplying the injection assembly motors 40 and 39 and cylinders 37 via the check valve 56 and solenoid operated valve 57, and the pump P2 supplying the mold actuating circuit via the solenoid operated valves 58 and 59. The check valve 60 between the output sides of the pumps P1 and P2 enables both pumps to deliver fluid to the mold actuating circuit. The delivery lines 61 and 62 to the respective solenoid valves 57 and 59 are interconnected through a sequence valve 63 and line 64 which is operative in a manner hereinafter described. The return ports of the valves 57 and 58 are interconnected by line 65 as shown and said line 65 is interconnected with the solenoid valve 59 via check valve 67.

The lines 70 and 71 leading to opposite ends of cylinder 20 from valve 58 have adjustable orifices 72 and 73 therein to determine the speed of actuation of the mold actuating cylinder on its mold closing and opening strokes. The line 74 leading to the rotary motor 40 has therein a check valve 75 and a flow control valve 76, and the line 78 leading to the head ends of the cylinders 37 has therein an orifice check valve 79 and a shut-off valve 80. The line 81 leading from valve 57 to the head end of the injection cylinder 39 has therein a pressure regulating valve 82 and flow control valves 83 and 84 respectively to determine the back pressure in cylinder 39 during rotation of the feed screw by motor 40 and to determine the speed of the downward injection stroke of the piston in cylinder 39. The line 81 also connects to the rod ends of cylinders 37. The return line 85 from motors 39 and 40 connects with the return line 65. The head end of the valve actuating cylinder 21 is connected by line 86 to line 71 leading to the rod end of the mold actuating cylinder 20 and the rod end of cylinder 21 is connected to valve 59 by line 87, said valve 59 together with adjustable restrictor 89 in the return line 52 constituting a low pressure closing valve as hereinafter explained. When sequence valve 63 is open the lines 61 and 62 are interconnected by line 64.

When the solenoid valve 57 is energized toward the left, the pump P1 delivers fluid under pressure via check valve 56, line 61, and lines 74 and 78 to the rotary screw motor 40 to turn the screw in the heating cylinder 32 (via check valve 75 and flow control valve 76) and to actuate the lift cylinders 37 to lift the injection assembly 30 (via orifice check valve 79 and shut-off valve 80). Return oil from the screw motor 40 is conducted to the return line 52 via lines 85 and 65 and check valve 67. As the screw rotates it propels the plastic material from the hopper 38 downwardly therealong toward the tip of the screw to melt the material in the heating cylinder 32 and deposit it into a collecting chamber at the lower end of the heating cylinder 32 whereby buildup of pressure on the material in the collecting chamber forces the feed screw upwardly with consequent upward movement of the piston in the injection cylinder 39, the oil from the upper end of said cylinder 39 being returned to the return line 52 via the adjustable orifice 83, pressure regulating valve 82, solenoid valve 57, line 65, and check valve 67. Accordingly, the pressure exerted on the melted material in the collecting chamber is determined by pressure regulating valve 82 and the back pressure in the upper end of the injection cylinder 39 depending upon the setting of the adjustable orifice 83.

During this operation the mold 5–6 is open and when the signal is given to close the mold, the solenoid valve 57 will be deenergized and solenoid valve 58 will be energized to the left, the capacity of both pumps P1 and P2 being utilized to actuate the cylinder 20 for fast travel. The clamping piston 14 will thereby be actuated to the left whereby its piston rod 15 actuates the mold 6-platen 16 toward mold closing position at a rapid rate. The oil displaced from the rod end of the cylinder 20 is returned to the reservoir 50 via the variable restriction 73, valve 58, line 65, check valve 67, and return line 52. The negative pressure in chamber 19 and the back pressure in line 86 to the head end of the valve actuating cylinder 21 actuates the valve member 25 to open position whereby, as the clamping piston 14 moves to the left, the chamber 19 is maintained full of oil from the prefill tank 17 via the open passage 18. The rod end of the valve actuating cylinder 21 is communicated with the return line 52 via line 87 and valve 59 when the valve 59 is in neutral position as shown in FIG. 3.

When the mold section 6 is 1 inch or more away from mold section 5, a low pressure switch is actuated to energize the solenoid valve 59 to the left to communicate the pressure line 62 with the return line 52 via the variable restrictor 89 thus to reduce the maximum available pressure in line 70 to the head end of the mold closing cylinder 20. This affords low pressure mold protection to prevent mold damage if for example the molded part produced in the previous cycle has not cleared the mold 5–6 before the clamp closes. The hydraulic fluid actuating the cylinder 20 is maintained at such low pressure until the mold sections 5 and 6 come together and, therefore, if there is an obstruction between the mold sections 5 and 6 the operation of the machine will stop and an alarm may be sounded to signal the operator to remove the obstruction. Thereafter, the actuation of the mold actuating cylinder 20 may be continued until the mold sections 5 and 6 contact each other and, at that time, a touch switch will be actuated to deenergize the solenoid valve 58 and to energize the solenoid valve 59 toward the right whereby high pressure from the pump P2 is conducted through line 62, valve 59 to the rod end of the valve actuating cylinder 21 to close the valve member 25 and to conduct the high pressure fluid through the orifice 26 into the chamber 19 in the clamping cylinder 10 thus to pressurize the fluid in the clamping cylinder 10 to lock the mold sections 5 and 6 together at required tonnage for injection of plastic material into the mold cavity. Oil displaced from the valve actuating cylinder 21 is returned to the tank 50 via the valve 58 in neutral position, check valve 67, and return line 52.

When the touch switch has been operated as aforesaid, the solenoid valve 57 will be energized to move it to the right whereby pressure delivered by the pump P1 through the check valve 56, line 61, valve 57, pressure regulator 82 will actuate the cylinders 37 downwardly to engage the nozzle end of the heating cylinder 32 with the closed mold 5–6 and to tend to urge the piston in the injection cylinder 39 downwardly through the variable restrictor 84. When there is the required high clamping pressure in the chamber 19, the sequence valve 63 will open to conduct high pressure fluid to the injection cylinder 39 and to the cylinders 37 and, when the pressure of the feed screw on the plastic material in the collecting chamber exceeds the pressure for which the nozzle valve has been set, the nozzle opens for flow of plasticized material into the mold cavity.

When the shot has been completed, the solenoid valve 58 will be energized to the right to conduct fluid under pressure from both pumps P1 and P2 to the rod end of the mold actuating cylinder 20 for rapid opening of the mold, and pressure in the line 86 leading to the head end of the valve actuating cylinder 21 opens the valve member 25 for flow of oil from the chamber 19 into the prefill tank 17. Valve 59 is then in neutral position as shown whereby the fluid displaced from the rod end of the valve actuating cylinder 21 is returned through line 87 and valve 59 to the return line 52. At the time of energization of the valve 58 as aforesaid or thereafter the valve 57 is energized to the left to actuate the cylinders 37 and screw motor 40 for lifting the injection assembly 30 to disengage the nozzle end of the heating cylinder 32 from the mold 5–6 and to turn the feed screw to refill the collecting chamber with plasticized material preparatory to making the next shot after removal of the molded part from the open mold 5–6 and reclosing of the mold.

It is to be understood that the various switches referred to herein but not shown such as the low pressure limit switch, the touch switch, etc. will be appropriately located for actuation as described and, of course, a timer may be provided as disclosed in said patents to achieve desired control as therein disclosed.

I claim:

1. A mold clamping mechanism for an injection molding machine comprising a mold clamping cylinder having a piston reciprocable therein in mold closing and opening directions; a prefill tank having fluid communication with said clamping cylinder via a passage having a valve member therein which opens said passage during the mold closing and opening strokes of said clamping cylinder piston for flow of fluid from said prefill tank into said clamping cylinder and vice versa; a relatively smaller actuating cylinder secured to said mold clamping cylinder and having its piston operatively secured to said clamping cylinder piston to impart mold closing and opening strokes thereto; a valve actuating cylinder secured to said mold clamping cylinder and having a piston reciprocable therein with its piston rod extending into said passage to constitute said valve member operative to open said passage during said strokes of said clamping cylinder piston for flow of fluid as aforesaid from and into said prefill tank when fluid under pressure is conducted into one end of said valve actuating cylinder, and to close said passage when said clamping cylinder piston is in mold closing position and when fluid under pressure is conducted into the other end of said valve actuating cylinder, said valve member having an orifice from said other end of said valve actuating cylinder into said clamping cylinder thereby to pressurize the fluid confined in said clamping cylinder by said valve member when closed and thus lock said clamping cylinder piston in mold closing position for injection of plasticized material into said mold.

2. The mechanism of claim 1 in which valve means between a fluid pressure source and said actuating cylinders are operative simultaneously to conduct fluid under pressure to said actuating cylinders respectively to actuate said clamping cylinder piston in mold closing direction and to actuate said valve member to open said passage; said valve means, upon closing of said mold being operative to actuate said valve member to close said passage for flow of fluid under pressure from said pressure source into said mold clamping cylinder via said other end of said valve actuating cylinder and said orifice.

3. An injection molding machine having relatively movable mold carrying platens to define a mold cavity into which plasticized material is adapted to be injected when said platens are moved toward each other to close said mold and from which a molded part is adapted to be removed when said platens are moved apart to open said mold; one of said platens being movable and having a first piston thereon reciprocable in a first cylinder which has fluid communication with a prefill tank via a passage; a second relatively smaller cylinder secured to the head of said first cylinder and having a piston reciprocable therein with its piston rod slidably sealed in said head and connected to said first piston thus to move said one platen toward and away from the other platen to close or open said mold responsive to actuation of said second cylinder; a third cylinder secured to said head having a piston reciprocable therein with its piston rod extending into said passage to constitute a valve member movable in one direction in said passage responsive to fluid under pressure in one end of said third cylinder to open communication between said prefill tank and said first cylinder during movement of said first piston in opposite directions by said second piston and movable in the opposite direction in said passage responsive to fluid under pressure in the other end of said third cylinder to close said passage and open communication of said first cylinder with a fluid pressure source at the end of the mold closing movement of said one platen relative to the other platen via an orifice in the piston rod of said third piston which opens into said other end of said third cylinder thus to lock said mold in closed position for injection of plastic material into the mold cavity thereof.

4. The mechanism of claim 1 wherein a fluid pressure source and a four-way valve means are operatively connected to said actuating cylinder to actuate the piston in the latter and hence said mold clamping cylinder piston in mold closing and opening directions; wherein a flow restrictor means is disposed between said actuating cylinder and said valve means in the fluid return circuit when the piston in said actuating cylinder is actuated in mold closing direction; and wherein said valve actuating cylinder piston is actuated to passage opening position alternately by fluid pressure upstream of said flow restrictor means when said actuating cylinder piston is actuated in mold closing direction and by pressure downstream of said flow restrictor means when said actuating cylinder piston is actuated in mold opening direction.

5. The mechanism of claim 4 wherein another four-way valve means is operative in a neutral position to conduct fluid from said valve actuating cylinder to a reservoir when said valve actuating cylinder piston is actuated to open said passage; said another four-way valve means having a first operating position to divert a portion of the delivery of said fluid pressure source to said reservoir to decrease the fluid pressure in said actuating cylinder while the piston therein is being actuated in mold closing direction thus to prevent mold damage in the event that a molded part or other object obstructs the mold closing operation.

6. The mechanism of claim 5 wherein said another valve means has a second operating position to conduct fluid under high pressure into said other end of said valve actuating cylinder to actuate the piston therein to close said passage whereby said orifice conducts such high pressure fluid from said other end of said valve actuating cylinder into said clamping cylinder to pressurize the fluid confined therein.

7. The mechanism of claim 6 wherein a sequence valve means upstream of said another valve means is opened by predetermined rise in fluid pressure in said clamping cylinder to conduct high pressure fluid to an injection system for injecting plasticized material into said closed and locked mold.

* * * * *